United States Patent [19]
Zielinski et al.

[11] 4,167,157
[45] Sep. 11, 1979

[54] FLUID-BED AIR-SUPPLY SYSTEM

[75] Inventors: Edward A. Zielinski, Harwinton; Joseph R. Comparato, Bloomfield, both of Conn.

[73] Assignee: Combustion Engineering, Inc., Windsor, Conn.

[21] Appl. No.: 895,888

[22] Filed: Apr. 13, 1978

[51] Int. Cl.² .................. F22B 1/02; F23D 19/02
[52] U.S. Cl. ................. 122/4 D; 34/57 A; 165/104 F
[58] Field of Search ........... 122/4 D; 34/57 R, 57 A; 110/245, 263; 165/104 F

[56] References Cited
U.S. PATENT DOCUMENTS

| | | | |
|---|---|---|---|
| 3,763,830 | 10/1973 | Robinson et al. | 122/4 |
| 3,784,676 | 1/1974 | Moss | 122/4 |
| 3,902,462 | 9/1975 | Bryers | 122/4 |

Primary Examiner—Kenneth W. Sprague

[57] ABSTRACT

The air-supply system for a fluidized-bed furnace includes two air conduits for the same combustion zone. The conduits feed separate sets of holes in a distributor plate through which fluidizing air flows to reach the bed. During normal operation, only one conduit and set of holes is used, but the second conduit and set of holes is employed during start-up.

12 Claims, 5 Drawing Figures

FLUID-BED AIR-SUPPLY SYSTEM

BACKGROUND OF THE INVENTION

The Government of the United States of America has rights in this invention pursuant to Contract No. EX-76-01-2473 awarded by the U.S. Energy Research and Development Administration.

The present invention relates to the field of fluidized-bed boilers and in particular to systems and methods of delivering the fluidizing air to the beds.

The changing economic and regulatory environment has recently given new impetus to the study of the fluidized bed as a component in the design of a utility or industrial boiler. In order to employ the fluidized bed in such applications, it is necessary that the designs be adapted to allow a greater range of power production from the same fluidized-bed boiler than a simple one-zone bed would afford. Accordingly, most fluidized-bed boilder designs include several combustion zones, each of which is an individual fluidized bed, so that the "turn down" percentage of the unit can be equal to that desired by the boiler operator. Though the boiler would accordingly comprise several individual zones, obvious economic considerations dictate that as much equipment as possible be common to all of the zones. Of most relevance to the present discussion is the desirability of providing a single fluidizing air souce for all the zones of a single boiler.

Certain design difficulties present themselves when it is attempted to supply all the zones from a single air source. One of these has to do with the difference in characteristics between a zone that is just starting up and a zone that has been operating for some time. The operation of the bed requires a certain fluidizing velocity of the air that is supplied. Given this fluidizing velocity, the bed area, and the temperature of the bed, a resultant weight rate of air is dictated. This amount of air flows from a fan through an appropriate conduit system, through the distributor plate on which the bed material rests, and through the bed material itself. This accordingly results in a certain pressure drop that the fan must overcome, and the system would typically be designed to take into account all of these conditions. During start-up, however, the bed temperature is quite a bit lower, perhaps half as high, in absolute terms, as that during normal operation, and this necessitates twice as high, a weight rate of air flow to achieve the desired fluidizing velocity. Since temperatures in the rest of the air-supply system are approximately the same during start-up they are during steady-state operation, the volume rate of air flow is doubled, resulting in roughly four times the pressure drop. This makes it necessary to damper the air conduits feeding zones already in operation. Otherwise, those conduits which are necessarily in parallel with those supplying the zone starting up, would permit too high an air flow in response to the increased pressure required for operation of the new zone. This dampering, in addition to being highly inefficient from an operational standpoint, also necessitates the provision of fans or other air-supply mechanisms that are rated for the job of supplying the total volume required by all the zones at the pressure required for start-up. This is expensive from a capital standpoint, and it further adds to operational inefficiencies because the fan cannot operate in its most efficient range during normal operation. Accordingly, the designer of a several-zone system is faced with the choice of either providing an individual air supply for each zone or employing a single air supply for all the zones that would usually be operating outside its most efficient range.

A related problem is inherent in fluidized-bed operation even if the fluidized bed comprises only a single zone. As mentioned above, the air-supply system at start-up experiences roughly four times as much pressure drop under start-up conditions as under normal operation if twice as high a temperature in absolute terms is expected during normal operation as is expected at start-up. Since a minimum pressure drop during normal operation is normally required for proper air distribution at the distributor plate, a start-up pressure drop was dictated in the prior art that was relatively high. For many designs, this dictated start-up pressure drop was too high, as a practical matter, to be easily powered by the conventional forced-draft-fan system whose use would be preferred. The fluid-bed designer thus had either to employ a specially designed fan for this system or use complicated series systems or compressors with all their associated control problems.

In Atabay, "Fluid-Bed Air-Supply System," filed concurrently with the present specification, there is disclosed the system described below for avoiding the difficulties just discussed. The Atabay application claims the feature of the method and apparatus described herein whereby a bypass air-conduit means is employed in the lower-temperature ranges of bed operation to avoid the high pressure that would otherwise be encountered at start-up of a zone.

SUMMARY OF THE INVENTION

The present invention is an improvement over the invention claimed in Atabay. The Atabay apparatus is an air-supply system for a fluidized-bed zone that includes a distributor plate that supports bed material and is perforated to form a set of holes that permit a flow of air therethrough for fluidization of the bed material and support of combustion in the zone. It also includes a means for providing an air-pressure increase from an air inlet to an air outlet. A main air-conduit means has an inlet arranged in fluid communication with the outlet of the pressure-increase means and an outlet connected to the distributor plate in such a manner that air leaving the outlet of the main air-conduit means flows through the set of holes in the distributor plate to the bed material. Operation of the pressure-increase means thereby tends to cause a flow of air through the air air-conduit means and the distributor plate to the bed material. The apparatus further includes a bypass air-conduit that has an inlet arranged in fluid communication with the outlet of the pressure-increase means. Its outlet is so positioned that air leaving its outlet flows into the bed material without passing through the set of holes through which the main conduit means communicates with the bed material. Means are provided for restricting air flow in the bypass conduit means when the flow-restriction means is operated. This restriction is performed without restricting the flow in the main air-conduit means; operation of the flow restriction means thereby tends to restrict to the main conduit means of air flow between the pressure-increase means and the bed material.

According to the Atabay method, the pressure-increase means is operated, and air thereby tends to flow through the conduit means. Flow is permitted in the bypass conduit means while the temperature immediately above the distributor plate is near an expected start-up temperature, but flow is restricted there when the temperature rises above the start-up temperature.

In the preferred embodiment of the Atabay invention, the flow resistance of the main air-conduit means is such as to permit an amount of air flow in response to a predetermined air pressure from the pressure-increase means that results in a desired fludizing air velocity above the distributor plate when the temperature immediately above the distributor plate is at a desired operating temperature. The flow resistance of the bypass air conduit means is such as to permit an amount of air to flow in response to the predetermined air pressure from the pressure-increase means that when added to the air flow permitted by the main air-conduit means results in the desired fluidizing velocity above the distributor plate when the temperature immediately above the plate is at an expected start-up temperature that is below the desired operating temperature.

According to another aspect of the Atabay invention, the fluidized-bed system includes a plurality of zones such as the one previously described. According to this aspect of the invention, the air-supply system has a pressure-increase means as before, but there are a plurality of main air-conduit means, one associated with each of the zones. At least a chosen one of the zones has associated with it a bypass conduit means of the type previously described. With each of the chosen zones is associated a means for restricting flow in the bypass air-conduit means, so operation of one of the flow-restriction means tends to restrict to its associated main conduit means the air flow between the pressure-increase means and the bed material in its associated zone.

In this aspect of the Atabay invention, too, the method involves operating the pressure-increase means, and air again tends thereby to flow through the main and bypass conduit means. Flow is permitted in the main and bypass conduit means associated with each zone in which the temperature immediately above the plate is near or expected start-up temperature, but the flow is restricted in each bypass conduit means that is associated with a zone in which the temperature immediately above the plate is above the expected start-up temperature.

According to the present invention, the distributor plate is further perforated to form a second set of holes. The outlet of the bypass air-conduit means is connected to the distributor plate in such a manner that air leaving its outlet flow through the second set of holes in the distributor plate to the bed material without flowing through the first set of holes. The outlet of the main air-conduit means is connected to the distributor plate in such a manner that air leaving the outlet of the main air-conduit means flows through the first set of holes to the bed material, but not through the second.

According to the preferred embodiment, there is a channel-forming member attached to the lower surface of the distributor plate and so shaped and positioned as to cover the first set of holes and form a channel between the channel-forming member and the plate. The channel member is penetrated to form an opening, and the bypass conduit means is attached at its outlet to the channel member in such a manner as to cover the opening in the channel member and provide fluid communication between the outlet of the bypass conduit means and the channel.

BRIEF DESCRIPTION OF THE DRAWINGS

These and further features and advantages of the present invention are described in connection with the attached drawings, in which.

DETAILED DESCRIPTION OF THE PREFERRED EMBODIMENT

Figure 1:
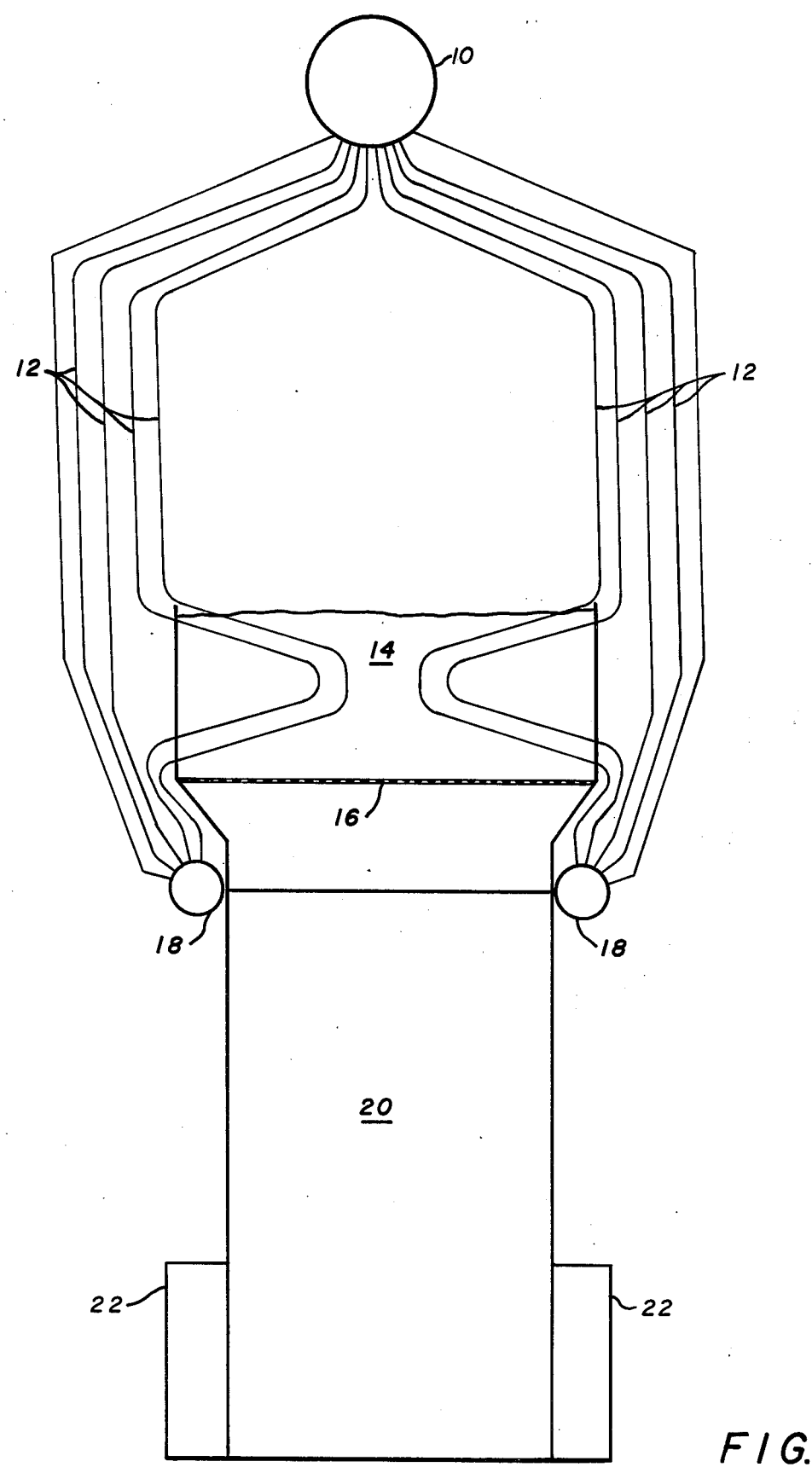
FIG. 1 is a simplified vertical elevation of a fluidized-bed boiler built according to the teachings of the present invention.

FIG. 1 is a vertical elevation of a boiler built according to the teachings of the present invention. A bed 14 contains bed material, typically limestone and coal. Combustion of the coal is carried out to release heat energy, and the limestone acts to absorb sulfur from the combustion products. Air distribution plates 16 support the bed materials but are perforated to form sets of holes through which air may flow to provide fluidization. Air is delivered to the bed 14 through the air distribution plates 16 from an air plenum 20 that extends vertically below the air distribution plates 16. As will be seen below, the air plenum 20 is divided into sections that extend through the height of the plenum 20. In the embodiment illustrated in the remaining drawings, there are eight such sections, each of which feeds a separate zone of the fluid bed 14. Each of these plenum sections is fed by one of the main air conduits 22 that extend horizontally on either side of the lower end of the air plenum 20.

Air enters through the conduit 22, flows up through the sections of the air plenum 20, flows through the air distribution plate 16 and enters into reaction with the coal in the fluidized bed 14 to release heat for boiling. Water that is to be boiled flows from the lower drums 18 situated below the bed 14 and to the sides of the air plenum 20. The lower drums 18 are headers from which boiler tubes 12 pass to a steam drum 10. Some of the tubes 12 pass through the bed 14, while others are arranged to absorb heat from flue gases above the bed 14. Water from the lower drums 18 absorbs the heat liberated by combustion of the coal, and some of the water is thereby vaporized. The vapor is separated in the steam drum 10 from the water that remains in the liquid state, and downcomers not shown return the remaining liquid to the lower drums 18 for further passage through the bed.

Figure 2:
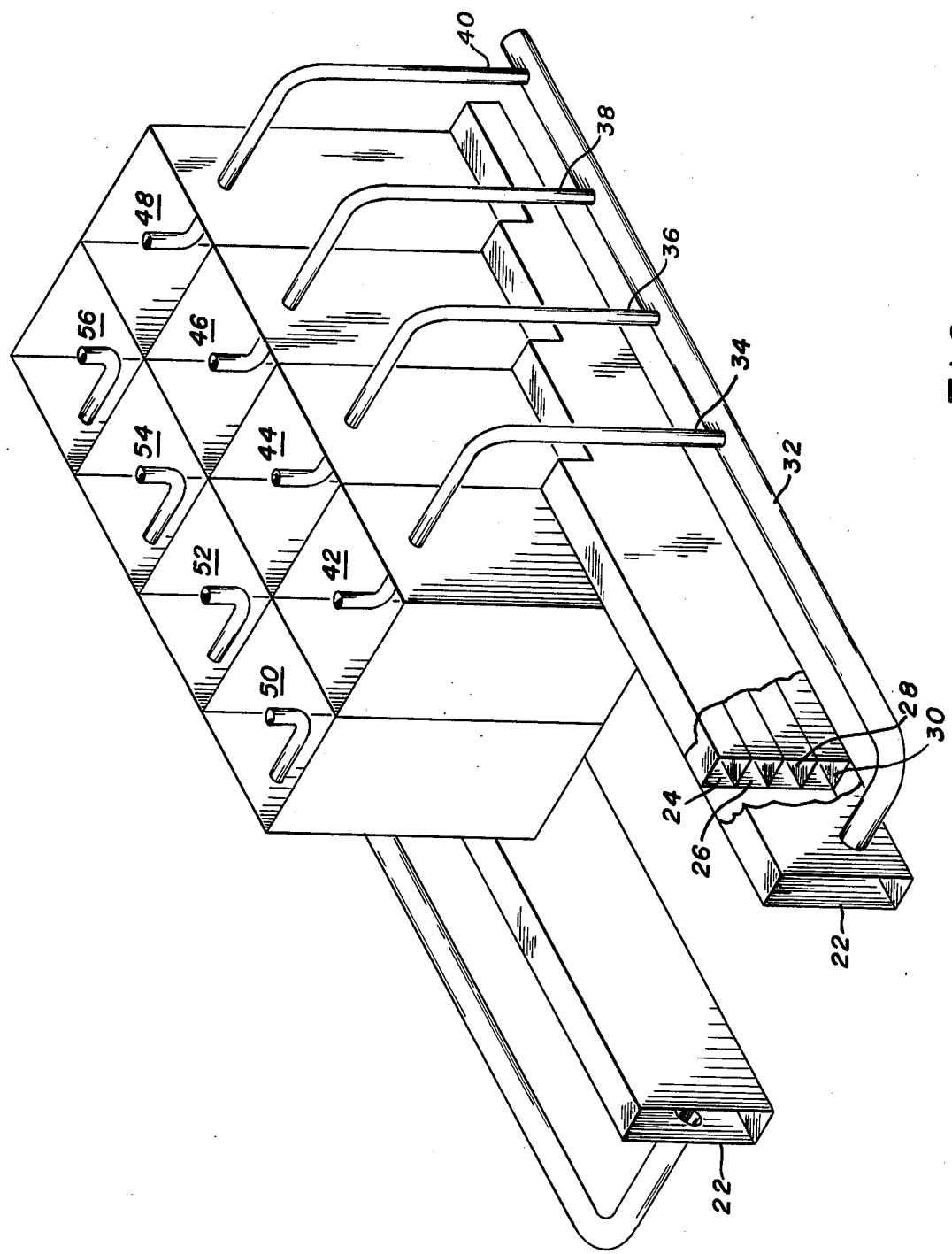
FIG. 2 is a simplified perspective view of the main- and bypass-air conduits that supply the eight zones of the fluidized-bed boiler shown in FIG. 1.

The arrangement shown in FIG. 1 for the delivery of air from the air conduit 22 to the air plenum 20 can be more fully appreciated by referring to FIG. 2, which is a perspective view of the air plenum 20 showing the various plenum sections. As seen in FIG. 2, the air plenum 20 is divided into eight sections 42 through 56. The main air conduits 22 also feed plenum sections 50 through 56. According to the present invention, the fluid-bed zones are fed not only by the main air conduits 22 but also by bypass-air conduits. A main bypass conduit 32 branches from a main air conduit 22 and feeds four of the zones through bypass-air branches 34 through 40. Similar bypass conduits feed the other four fluid-bed zones.

Figure 3:
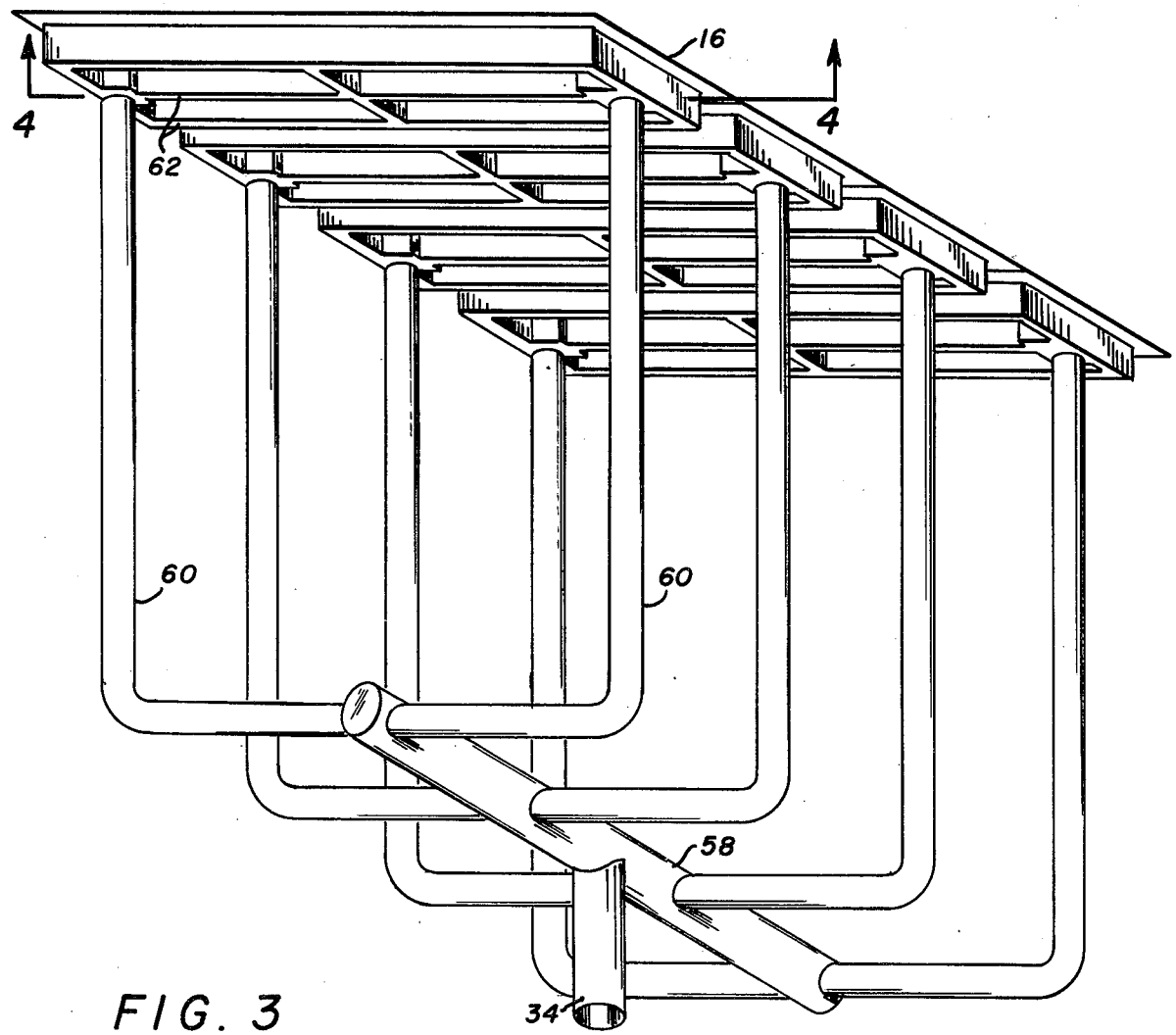
FIG. 3 is a perspective view of the bottom of the distributor plate of a single zone showing conduits for supplying bypass air to the distributor plate.

To illustrate the manner in which one of the bypass-air branches feeds an individual zone of the fluidized bed, reference is made to FIG. 3, which shows the distributor plate for the individual zone fed by air-plenum section 42. In FIG. 3, the distributor plate is fed by a group of sub-branches 60 of the bypass-air branch 34. The by-pass air branch 34 feeds a manifold 50 from which the sub-branch 60 distributes air to four bypass-air channels formed by channel members 62 that are secured to the lower surface of the distributor plate 16. The channel members 62 cover part of the lower surface of the distributor plate 16, and the distributor plate 16, which is perforated, feeds the bypass air from bypass-air branch 34 to the bed material by means of the set of holes in the distributor plate 16 that are covered by the channels 62. Other holes in the distributor plate 16 are not covered by the channels 62, and this set of holes is not fed bypass air. Instead, main air from main air conduit 24 feeds those holes by means of plenum section 42. It can thus be appreciated that plenum section 42 serves as an outlet of a main conduit means that is in fluid communication with the bed material by means of the set of holes in the distributor plate 16 that are not covered by the channel members 62. Similarly, the manifold 58 and sub-branches 60 serve as the outlet of a bypass conduit means that communicates with the bed material through the channel and the set of holes that are covered by the channel members 62.

Figure 4:
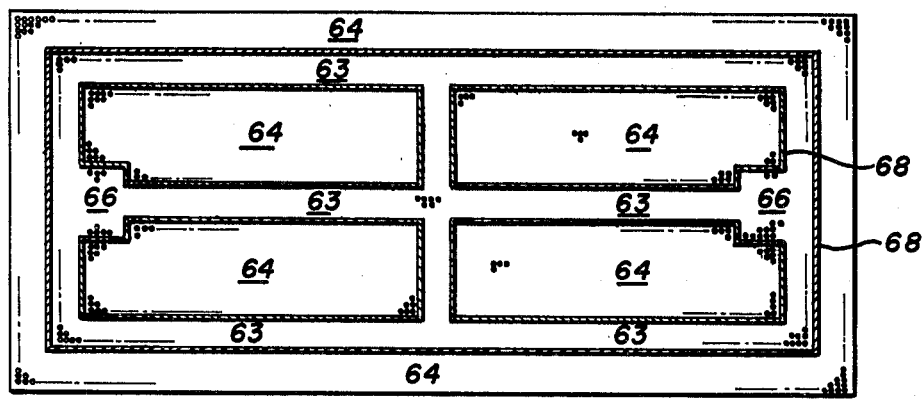
FIG. 4 is a sectional view of a single one of the grid plates of FIG. 3 taken at plane 4—4 of FIG. 3.

A better view of the division of distributor-plate area between the main air and the bypass air is shown in FIG. 4, which is a sectional view taken at plane 4—4 of FIG. 3. FIG. 4 shows one-quarter of the plate area illustrated in FIG. 3, and the plate area shown in FIG. 4 is divided into two sets of holes by partitions 68. Between the partitions 68 is defined an area 63 that is covered by the channel 62. The holes in this area 63 are those through which bypass air reaches the bed material. The bypass air flows through the sub-branches 60 and reaches the channel 62 approximately in the positions indicated by reference numerals 66. From there, the air is distributed throughout plate area 63. The partitions 68 also define another area 64 that is exterior to the channel 62. Air introduced through the sub-branches 60 cannot reach the holes in plate area 64, but air from pleunum section 42 can flow directly through the holes in area 64 into the bed material. Accordingly, there are two sets of holes, a first set through which the main air reaches the bed material and a second set through which bypass air reaches it.

Figure 5:
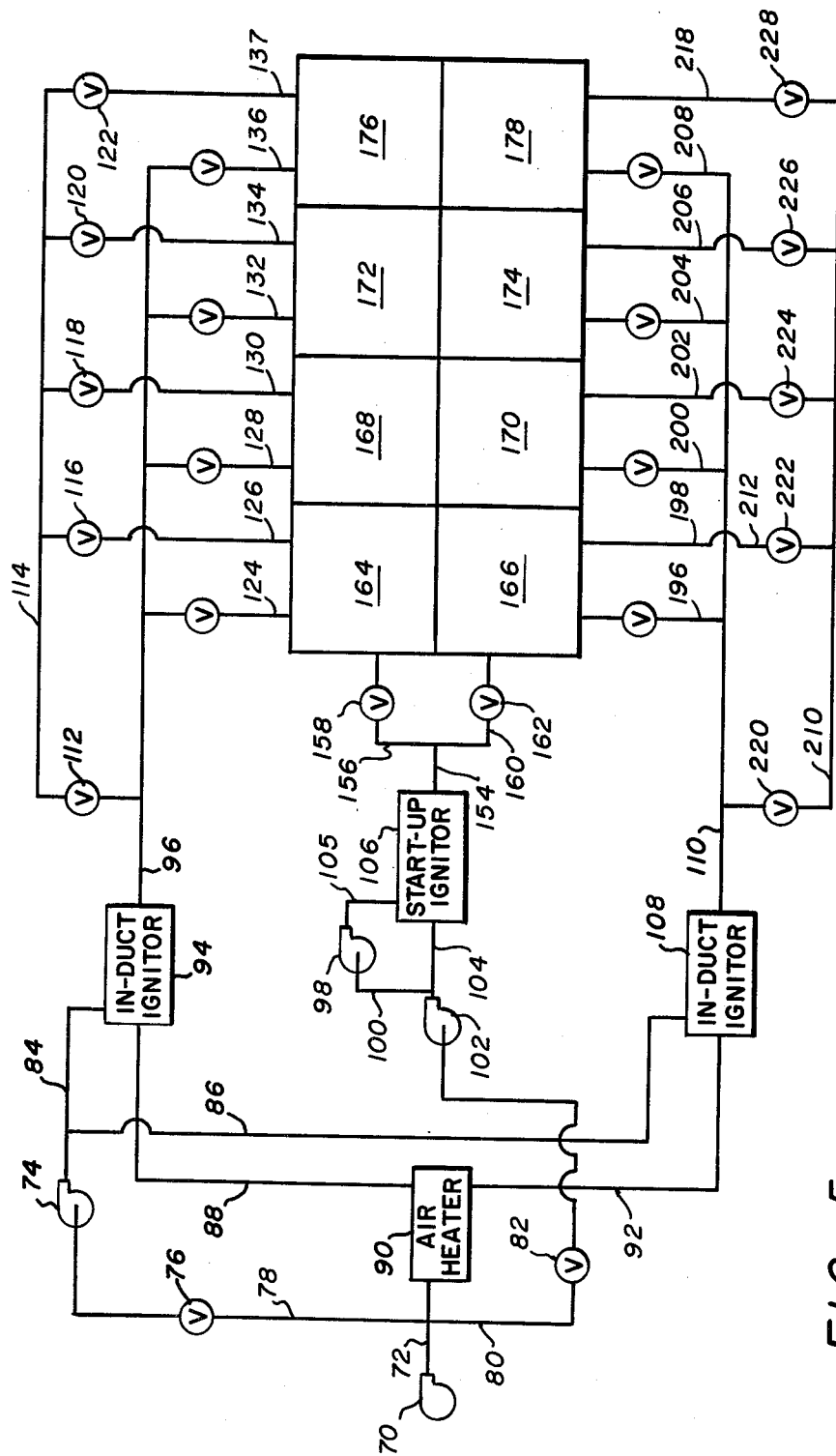
FIG. 5 is a schematic diagram of the air-supply system of the present invention.

In FIG. 5, which is a schematic diagram of the air-supply system of the present invention, the eight fluidized-bed zones are identified by reference numerals 164 through 178. Half the zones receive main air from line 96, while the other four are fed from line 110. Lines 96 and 110 represent the conduits 22 of FIG. 2. Line 96 branches off into four lines 124, 128, 132, and 136, while line 110 branches into lines 196, 200, 204, and 208. These branch lines represent air paths such as that exemplified by conduit 24 and plenum section 42 of FIG. 2, and flow through them is controlled by dampers 146, 148, 150, 152, 180, 182, 184, and 186.

A bypass-air line 210 represents a conduit such as bypass conduit 32 of FIG. 2 that branches off from the main air supply upstream of the main air branches. Another bypass-air line 114 also branches off from the main air and branches in turn into lines 126, 130, 134, and 137, which feed zones 164, 168, 172, and 176, respectively. Likewise, bypass branch lines 212, 214, 216, and 218, which represents bypass branch conduits 34, 36, 38, and 40 of FIG. 2, feed zones 166, 170, 174, and 178, respectively.

Air flow for these various lines is supplied from a main forced-draft fan 70. The fan 70 is picked to supply a predetermined air-pressure increase from its inlet to its outlet while handling something in excess of the volume rate of air needed for steady-state operation of the whole bed at the desired operating temperature. An air path comprising line 72, an air heater 90, line 88, and an in-duct igniter 94 delivers air from the forced-draft fan 70 to one of the main air lines 96. The other of the main air lines 110 is fed by a flow path comprising line 72, and air heater 90, line 92, and an in-duct igniter 108. During steady-state operation, bypass-air lines 114 and 210 are blocked by dampers 112 and 220, respectively, which are closed to keep all air from the forced-draft fan 70 flowing into the main air lines 96 and 110. Further dampers 116, 118, 120, 122, 222, 224, 226, and 228 are interposed in bypass branch lines 126, 130, 134, 137, 212, 214, 216, and 218, respectively, for use during start-up of their associated zones. When zone 170 is to be started up, for example, dampers 220 and 224 will be open to allow zone 170 to receive bypass air. As the temperature immediately above the distributor plate in zone 170 rises, damper 224 will be operated to restrict the flow of bypass air to the zone so that the desired fluidizing velocity will not be exceeded.

The in-duct igniters 94 and 108 previously mentioned are typically oil or gas burners located in the air line for heating the air to approximately 750° F. (400° C.). The purpose of the in-duct igniters 94 and 108 is to provide the proper air temperature during those times when the unit has not reached a temperature high enough for the air heater 90 to bring the air to the desired temperature. The air heater 90 employs flue gases to warm up the combustion air, and the flue gases are cooled to too low a temperature before they reach the air heater if the boiler is just starting up. Pressurized air needed for injection of the fuel into the in-duct igniter 94 is supplied through a route comprising part of line 72, line 78, in-duct-igniter fan 74, and line 84. The in-duct-igniter fan 74 provides a pressure increase so that a fuel-air mixture may be injected into the duct against the air pressure inside. The other in-duct igniter 108 is similarly supplied through a conduit 86 that branches off line 84. The igniter-air route is provided with a suitable damper 76 for controlling air flow.

Zones 164 and 166 have further inlet lines 156 and 160 that are used during start-up of the first zone. Since zones 164 and 166 are the zones that can be started up first, there are times when no flame is in the bed to ignite these zones. Special equipment is therefore provided for initiating combustion in these zones. This special equipment includes line 80, damper 82, booster fan 102, line 104, line 100, start-up-igniter fan 98, line 105, start-up igniter 106, line 154, lines 156 and 160, and dampers 158 and 162. The booster fan 102 is provided to make up for the difference in pressure drop between the start-up air path of which it is a part and the parallel main- and bypass-air paths. The igniter 106 is similar to the in-duct igniters 94 and 108, with the exception that it heats up the air to around 1400° F. (760° C.). The start-up-igniter fan 98 performs a function similar to that of the duct-igniter fan 74. The start-up igniter 106 is operated when it is desired to start the boiler cold, and 1400° F. (760° C.) is above the ignition temperature of the coal in zones 164 and 166, so the coal in those zones is ignited by the heat of the air flowing through lines 156 and 160.

When the fluidized-bed boiler is to be started up, combustion is initiated in one or both of zones 164 and 166. If zone 164 is used for start-up, the appropriate dampers are operated to provide air only to zone 164 through lines 124 and 126. The forced-draft fan 70 begins operation, as does the in-duct-igniter fan 74 after damper 76 opens air line 78. The operation of the in-duct-igniter fan 74 enables a pressurized flow of fuel and air to enter the line 94 despite the pressure in the line. Air flows into zone 164 from lines 124 and 126, the air gradually heating up due to the effect of in-duct igniter 94. This continues until the air reaches approximately 750° F. (400° C.). At this temperature, with air flowing both through main line 124 and bypass line 126, the air flowing into zone 164 has reached the fluidizing velocity, so the coal and limestone in the bed attain the quasi-liquid state desired for fluidized-bed operation.

Once these fluidizing conditions have been reached, the damper 82 in the air path from the forced-draft fan 72 to the booster fan 102 is opened, as is the damper 158 in the air line that leads to zone 164 from the start-up ignitor 106. The booster fan 102 then starts operation, as does the start-up ignitor fan 98. The start-up ignitor 106 starts to receive fuel and begins operation, and a small stream of ignition air enters zone 164 immediately adjacent to its fuel inlet (not shown). When this ignition-air temperature reaches 1400° F. (760° C.), high enough to ignite the fuel, fuel is fed to zone 164 and combustion starts.

The temperature in zone 164 increases as combustion occurs. This makes the combustion in the zone self-sustaining and eliminates the need for the start-up ignitor 106, which is then shut down along with its associated equipment. The increase in temperature in the bed also increases the air velocity for a given weight rate of air delivered by the fan 70. Accordingly, damper 116 is operated to restrict the flow in the bypass conduit means, and by the time that the bed temperature reaches the desired operating level, the damper 116 in bypass-air branch line 126 is closed so that air is only delivered to zone 154 through main-air branch line 124.

As previously mentioned, ignitor equipment is also provided for zone 166, but its purpose is only to afford flexibility; if the bed is started at zone 164, no ignitor is required for zone 166. Accordingly, when zone 166 is to be started, air is supplied through main-air branch line 196 and bypass-air branch line 198. At this point, the flue gases passing through the air heater 90 may provide enough heat to the fluidizing air that the use of duct ignitors 94 and 108 is not required. It this is the case, the damper 76 and the air line 78 between the forced-draft fan 70 and the duct-ignitor fan 74 is closed and the duct-ignitor fan 74 is not operated. Thus, air is supplied to zone 166 by means of main and bypass air-conduit means that include air line 72, the air heater 90, air line 92, the duct ignitor 108 (which is not operating), the main- and bypass-air lines 110 and 210, and main- and bypass-air branch lines 196 and 198. It is noted that this air path is in parallel with the main air-conduit means that feed the first zone 164. Accordingly, the pressure drops through these parallel paths are equal. However, in order for both zones to have an air flow that achieves a proper fluidizing velocity, approximately twice as much air by weight must be delivered to zone 166 as is delivered to zone 164, because the absolute temperature in zone 164 is approximately twice that as in zone 166. Without the distributor-plate arrangement illustrated in FIG. 4, this equality of pressure drops would result in either too high a fluid velocity in zone 164, too low a fluid velocity in zone 166, or a large amount of dampering in the fluid path to zone 164. None of these alternatives is desirable. With the arrangement illustrated in the drawings, however, twice as much air can be delivered to zone 166 as is delivered to zone 164 even though the pressure drop in the two paths is the same and even though no considerable dampering is introduced into the path to zone 164.

As the temperature in zone 166 increases, damper 222 is operated to restrict the flow in the bypass conduit means by the amount necessary to keep the air velocity in zone 166 near the desired fluidizing velocity, and the bypass-air branch 198 is ultimately closed.

The same procedure is followed when further zones are brought into operation.

It can be seen from the foregoing description that the forced-draft fan 70 does not need to supply the large pressure drop that would result from delivering the fluidizing air at startup through only those holes that are used during normal operation, so operation of an individual zone is facilitated. Furthermore, the pressure drop in the path to zones already in operation does not need to be increased while other zones are started. Accordingly, fans need only be provided to accommodate the lower steady-state pressure drop.

What is claimed is:

1. In a fluidized-bed zone comprising a distributor plate that supports bed material and is perforated to form a first set of holes that permit a flow of air therethrough for fluidization of the bed material and support of combustion in the zone, the zone further comprising an air-supply system that comprises:

means, having an air inlet and an air outlet, for providing and air-pressure increase from the inlet to the outlet;

a main air-conduit means having an inlet arranged in fluid communication with the outlet of the pressure-increase means and having an outlet connected to the distributor plate in such a manner that air leaving the outlet of the main air-conduit means flows through the first set of holes and the distributor plate to the bed material, the pressure-increase means thereby tending to cause a flow of air through the main air-conduit means and the distributor plate to the bed material;

a bypass air-conduit means having an inlet arranged in fluid communication with the outlet of the pressure-increase means and having an outlet so positioned that air leaving the outlet flows into the bed material without passing through the first set of holes; and means for restricting air flow through the bypass conduit means, when the flow-restriction means is operated, without restricting flow in the main conduit means, operation of the flow-restriction means thereby tending to restrict to the main conduit means the air flow between the pressure-increase means and the bed material, the improvement wherein:
  a. the distributor plate is further perforated to form a second set of holes therethrough;
  b. the outlet of the main conduit is connected to the distributor plate in such a manner that air leaving the outlet of the main conduit flows through the first set of holes in the distributor plate without flowing through the second set of holes; and c. the outlet of the bypass conduit is connected to the distributor plate in such a manner that air leaving the outlet of the bypass conduit flows through the second set of holes without flowing through the first set of holes.

2. An apparatus as recited in claim 1, wherein:

a. the flow resistance of the main air-conduit means is such as to permit an amount of air flow, when the main conduit means is subjected to a predetermined air pressure by the pressure-increase means, that results in a desired fluidizing air velocity above the distributor plate when the temperature immediately above the plate is at a desired operating temperature;

b. the flow resistance of the bypass air-conduit means is such as to permit an amount of air flow, when the bypass air-conduit means is subjected to the predetermined air pressure by the pressure-increase means, that when added to the air flow permitted by the main air-conduit means, results in the desired fluidizing velocity above the distributor plate when the temperature immediately above the plate is at an expected start-up temperature that is below the desired operating temperature.

3. In the method of supplying air to bed material in a fluidized-bed system, the bed material being supported by a distributor plate that is perforated to form a first set of holes that permit air to flow through them for fluidization of the bed material and support of combustion in the bed material, that comprises the steps of:

providing an air-supply system that includes:
(i) means, having an air inlet and an air outlet, for providing an air-pressure increase from the inlet to the outlet,
(ii) a main air-conduit means having an inlet arranged in fluid communication with the outlet of the pressure-increase means and having an outlet connected to the distributor plate in such a manner that air leaving the outlet of the main air-conduit means flows through the first set of holes in the distributor plate to the bed material, the pressure-increase means thereby tending to cause a flow of air through the conduit means and the distributor plate to the bed material, and
(iii) a bypass conduit means having an inlet arranged in fluid communication with the outlet of the pressure-increase means and having an outlet so positioned that air leaving the outlet flows into the bed material without passing through the bed material;

operating the pressure-increase means, air thereby tending to flow through the conduit means;

permitting flow in the main and bypass conduit means while the temperature immediately above the plates is near an expected start-up temperature; and restricting flow in the bypass conduit means when the temperature immediately above the plate is above the expected start-up temperature;

the improvement wherein:

a. the distributor plate is further perforated to form a second set of holes therethrough;

b. the outlet of the main conduit means is connected to the distributor plate in such a manner that air leaving the outlet of the main conduit fows through the first set of holes in the distributor plate without flowing through the second set of holes; and c. the outlet of the bypass conduit means is connected to the distributor plate in such a manner that air leaving the outlet of the bypass conduit means flows through the second set of holes without flowing through the first set of holes;

the steps of preventing and permitting flow in the bypass conduit means thereby comprising preventing and permitting flow of air through the second set of holes.

4. A method as recited in claim 3, wherein:

a. the flow resistance of the main air-conduit means is such as to permit an amount of air flow, when the main conduit means is subjected to a predetermined air pressure by the pressure-increase means, that results in a desired fluidizing air velocity above the distributor plate when the temperature immediately above the plate is at a desired operating temperature;

b. the flow resistance of the bypass air-conduit means is such as to permit an amount of air flow, when the bypass conduit means is subjected to the predetermined air pressure by the pressure-increase means, that when added to the air flow permitted by the main air-conduit means results in the desired fluidizing velocity above the distributor plate when the temperature immediately above the plate is at an expected start-up temperature that is below the desired operating temperature.

5. In a fluidized-bed system comprising a plurality of zones, each zone comprising a distributor plate that supports bed material and is perforated to form a first set of holes that permit a flow of air therethrough for fluidization of the bed material and support of combustion in the zone, the system further comprising an air-supply system that comprises:

means, having an air inlet and an air outlet, for providing an air-pressure increase from the inlet to the outlet;

a plurality of main air-conduit means, each zone being associated with one of the main air-conduit means, each of the main air-conduit means having an inlet arranged in fluid communication with the outlet of the pressure-increase means and having an outlet connected to the distributor plate of its associated zone in such a manner that air leaving the outlet of each of the main air-conduit means flows through the first set of holes in its associated distributor plate to the bed material in its associated zone, operation of the pressure-increase means thereby tending to cause a flow of air through the main conduit means and their associated distributor plates to the bed material in their associated zones; and at least one bypass air-conduit means, each of at least a chosen one of the zones being associated with the bypass air-conduit means, each bypass means thereby being associated with one of the main conduit means, each bypass conduit means having an inlet arranged in fluid communication with the outlet of the pressure-increase means and having an outlet so positioned that air leaving the outlet of the bypass conduit means flows into the bed material in its associated zone without passing through the first set of holes through which its associated main conduit means communicates with the bed material, the improvement wherein:

a. the distributor plates of the chosen zones are further perforated to form second sets of holes therethrough;
b. the outlets of the main conduit means associated with the chosen zones are connected to the distributor plates of their associated zones in such a manner that air leaving the outlets of such main conduit means flows through the first sets of holes in their associated distributor plates without flowing through the second sets of holes therethrough; and
c. the outlets of the bypass conduit means are connected to the distributor plates of their associated zones in such a manner that air leaving the outlets of the bypass conduit means flows through the second sets of holes in the distributor plates of their associated zones without flowing through the first sets of holes therethrough.

6. An apparatus as recited in claim 5, wherein:
a. the flow resistances of the main air-conduit means are such as to permit an amount of air flow in each main conduit means, when the conduit means are subjected to a predetermined pressure from the pressure-increase means, that results in a desired fluidizing air velocity above the distributor plate of its associated zone when the temperature immediately above the plate of its associated zone is equal to a desired operating temperature; and
b. the flow resistances of the bypass air-conduit means are such as to permit an amount of air flow in each bypass air-conduit means, when the bypass air-conduit means are subjected to the predetermined air pressure by the pressure-increase means, that when added to the air flow permitted by its associated main air-conduit means, results in the desired fluidizing velocity above the distributor plate of its associated zone when the temperature immediately above the plate is at an expected start-up temperature that is below the desired operating temperature.

7. In the method of supplying air to a fluidized-bed system that comprises a plurality of zones, each zone comprising a distributor plate that supports bed material and is perforated to form a first set of holes that permit a flow of air therethrough for fluidization of the bed material and support of combustion in the zone, that comprises:
providing an air-supply system that includes:
(i) means, having an air inlet and an air outlet, for providing an air-pressure increase from the inlet to the outlet,
(ii) a plurality of main air-conduit means, each zone being associated with one of the main air-conduit means, each of the main air-conduit means having an inlet arranged in fluid communication with the outlet of the pressure-increase means and having an outlet connected to the distributor plate of its associated zone in such a manner that air leaving the outlet of each of the main air-conduit means flows through the first set of holes in its associated distributor plate to the bed material in its associated zone, operation of the pressure-increase means thereby tending to cause a flow of air through the main air-conduit means and their associated distributor plates to the bed material in their associated zones, and
(iii) at least one bypass air-conduit means, each of at least of a chosen one of the zones being associated with one of the bypass air-conduit means, each bypass conduit means thereby being associated with one main conduit means, each bypass conduit means having an inlet arranged in fluid communication with the outlet of the pressure-increase means and having an outlet so positioned that air leaving the outlet of each bypass conduit means flows into the bed material in its associated zone without passing through the first set of holes through which its associated first conduit means communicates with the bed material;
operating the pressure-increase means, air thereby tending to flow through the conduit means;
permitting flow through each of the bypass conduit means whose associated zone has a temperature immediately above its plate that is near an expected start-up temperature; and
restricting flow in each bypass conduit whose associated zone has a temperature immediately above its plate that is above the expected start-up temperature,
the improvement wherein:
a. the distributor plates of the chosen zones are further perforated to form second sets of holes therethrough;
b. the outlets of the main conduit means associated with the chosen zones are connected to the distributor plates of their associated zones in such a manner that air leaving the outlets of such main conduit means flows through the first sets of holes in their associated distributor plates without flowing through the second sets of holes therethrough; and
c. the outlets of the bypass conduit means are connected to the distributor plates of their associated zones in such a manner that air leaving the outlets of the bypass conduit means flows through the second sets of holes in the distributor plates of their associated zones without flowing through the first sets of holes therethrough.

8. A method as recited in claim 7, wherein:
a. the flow resistances of the main air-conduit means are such as to permit an amount of air flow in each main conduit means, when the conduit means are subjected to a predetermined pressure from the pressure-increase means, that results in a desired fluidizing air velocity above the distributor plate of its associated zone when the temperature immediately above the plate of its associated zone is equal to a desired operating temperature; and
b. the flow resistances of the bypass air-conduit means are such as to permit an amount of air flow in each bypass air-conduit means, when the bypass air-conduit means is subjected to the predetermined air pressure by the pressure-increase means, that when added to the air flow permitted by the associated main air-conduit means, results in the desired fluidizing velocity above the distributor plate in its associated zone when the temperature immediately above the plate in its associated zone is equal to an expected start-up temperature that is below the desired operating temperature.

9. An apparatus as recited in claim 1 or 2, further comprising a channel-forming member attached to the lower surface of the distributor plate and shaped and positioned to cover the first set of holes and to form a channel between the channel member and the plate, the channel member being penetrated to form an opening in the channel member, the bypass conduit means being attached at its outlet to the channel member in such a manner as to cover the opening in the channel member and to provide fluid communication between the outlet of the bypass conduit means and the channel.

10. A method as recited in claim 3 or 4, wherein the step of providing an air-supply system further comprises providing a channel-forming member attached to the lower surface of the distributor plate and shaped and positioned to cover the first set of holes and to form a channel between the channel member and the plate, the channel member being penetrated to form an opening in the channel member, the bypass conduit means being attached at its outlet to the channel member in such a manner as to cover the opening and to provide fluid communication between the outlet of the bypass conduit means and the channel.

11. An apparatus as recited in claim 5 or 6, further comprising a channel-forming member associated with each of the chosen zones and attached to the lower surface of the distributor plate of its associated zone, each channel-forming member being shaped and positioned to cover the first set of holes in its associated zone and to form a channel between the channel member and the plate, the channel member being penetrated to form an opening in the channel member, the bypass conduit means being attached at their outlets to the channel members associated with their associated zones in such a manner as to cover the openings in their associated channel members and to provide fluid communication between their outlets and the channels associated with their associated zones.

12. A method as recited in claim 7 or 8, wherein the step of providing the air-supply system further comprises providing a channel-forming member associated with each of the chosen zones and attached to the lower surface of the distributor plate of its associated zone and shaped and positioned to cover the first set of holes in the distributor plate of its associated zone and to form a channel between the channel member and the distributor plate in its associated zone, the channel member being penetrated to form an opening in the channel member, the bypass conduit means being attached to their outlets to the channel members associated with their associated zones in such a manner as to cover the openings in their associated channel members and to provide fluid communication between their outlets and the channels associated with their associated zones.

* * * * *